Sept. 30, 1958   R. L. SCHOENBERGER, JR   2,853,725
MACHINE FOR FORMING HINGE JOINTS IN CASED BOOKS
Filed June 19, 1956                                9 Sheets-Sheet 1

FIG. 1

Inventor:
Robert L. Schoenberger, Jr.
By Schroeder, Hofgren,
Brady & Wegner
Attorneys Sept. 30, 1958     R. L. SCHOENBERGER, JR     2,853,725
MACHINE FOR FORMING HINGE JOINTS IN CASED BOOKS
Filed June 19, 1956     9 Sheets-Sheet 4

FIG.2A

Inventor:
Robert L. Schoenberger, Jr.
By: Schroder, Hofgren,
Brady & Wegner
Attorneys

Sept. 30, 1958     R. L. SCHOENBERGER, JR     2,853,725
MACHINE FOR FORMING HINGE JOINTS IN CASED BOOKS
Filed June 19, 1956     9 Sheets-Sheet 7

Inventor:
Robert L. Schoenberger, Jr.
By Schrader, Hofgren,
Brady & Wegner
Attorneys

United States Patent Office 2,853,725
Patented Sept. 30, 1958

2,853,725

MACHINE FOR FORMING HINGE JOINTS IN CASED BOOKS

Robert L. Schoenberger, Jr., Crawfordsville, Ind., assignor to R. R. Donnelley & Sons Company, a corporation of Delaware Application June 19, 1956, Serial No. 592,292

11 Claims. (Cl. 11—1)

This invention relates to a machine for forming hinge joints in cased books, and in particular it relates to a machine in which the books are carried continuously on a conveyor belt and the joint forming irons travel straight forward at the same speed as the books whenever they are in gripping engagement with the books.

In the construction of a cased book, the signatures forming the book are first fastened together by sewing or by patent binding. The unbound book may then be rounded and backed preparatory to receiving the case, or cover, after which it passes through a "case-in" machine which glues the cover to the rounded and backed book. At this point there is no well defined hinge joint in the case of the book, but only a slight looseness where the outer fabric of the case or cover is free of the hard boards of the cover.

In order that the book may open properly, and also to complete the bonding of the end sheets to the case and to the signatures forming the book, the book is then subjected to a joint forming operation which presses grooves into the area along the rear margins of the cover boards. Since the joint forming operation is the last prior to wrapping, book spoilage at this stage is very expensive, so a joint forming machine must be very dependable and not likely to mark or otherwise damage the book cover. At the same time, in view of the very high speed of modern rotary printing presses it is desirable to speed up all the operations involved in producing a book from the printed signatures, so that a high speed joint former which can operate on a moving line of books is highly desirable. The present invention provides such a machine.

Joint forming devices now in use with continuous book binding machinery are of two general types—the so-called "drag" type and the intermittent type. In the drag type the books are drawn through fixed forming irons. This obviously has a great tendency to smear or remove color from the book cover, or to damage the book cover in some other way. It is only suitable for relatively low speed operation because the more rapid travel through the fixed irons increases the likelihood of cover damage.

The intermittent type moves the books forward stepwise and the forming irons move into nipping contact with the books only while the books are stationary. This ordinarily requires either precise spacing or an escapement feeder for proper book movement through the machine. The operation almost eliminates book damage; but any intermittent feed is sharply limited in rate of operation, and the intermittent movement naturally is accompanied by all the usual problems of machine wear, vibration, etc. which are common to such devices. The maximum speed of an intermittent book former is about 40 books a minute.

In accordance with the present invention books may be carried through a joint forming machine in random spacing with their joint areas longitudinally aligned and exposed. The joint forming irons move into nipping contact with the exposed areas of the books and simultaneously travel forward at the same speed as the books so that there is no dragging movement between the books and the irons. The irons move away from the books and return to their original positions where they may again close on the books which are carried in the conveyor means. Each book is nipped several times as it passes through the machine.

Thus, the principal object of the present invention is to provide an improved machine for forming hinge joints in cased books, and in particular to provide a machine which operates at high speed on continuously moving books without relative movement between the books and the joint forming irons.

Another object of the invention is to provide a joint forming machine which may handle a variety of different sized books, and which is quickly and easily adjusted to accommodate various sizes.

A further object of the invention is to provide a joint forming machine which may handle randomly spaced books.

Yet another object of the invention is to provide a machine which will produce a high quality book hinge joint and which will simultaneously provide uniform pressure on the book cover to smooth the cover on the book so as to produce a cased book of highest quality.

The invention is illustrated in the accompanying drawings, in which.

Referring to the drawings in greater detail, and referring first to Figs. 1–1A and 2–2A, the joint forming machine consists generally of a wheeled frame A on which is mounted a drive mechanism B for driving a book conveyor mechanism C and joint forming mechanism D.

Figures 7, 8, 9:
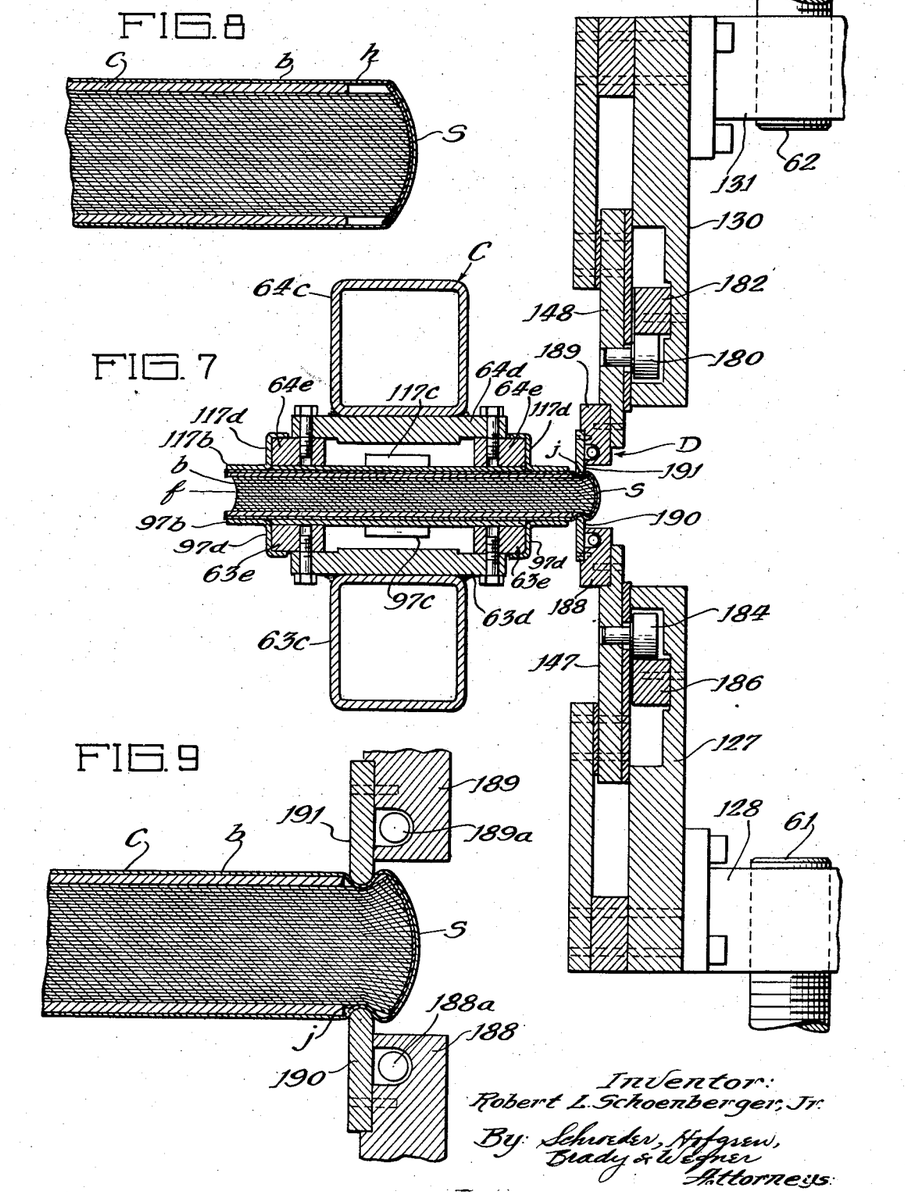
Fig. 7 is a fragmentary section on an enlarged scale taken substantially as indicated along the line 7—7 of Fig. 4.
Fig. 8 is a fragmentary transverse sectional view of a cased book before the hinge joint is formed.
Fig. 9 is a fragmentary transverse sectional view of a cased book with the joint forming irons nipping it.

The operation which is performed by the machine of the present invention is shown in Figs. 7, 8 and 9, in which Fig. 8 illustrates a book $b$ before it is passed through the machine; and Figs. 7 and 9 illustrate the book as the joint forming mechanism D acts upon it. In the drawings, the letter $c$ designates the case or cover of a book $b$, the letter $h$ the hinge area of the book prior to joint formation, and the letter *s* the spine of the book. As seen in Figs. 7 and 9 the conveyor mechanism C carries the book with the spine and hinge area exposed so that the joint forming mechanism D may exert intermittent joint forming pressure upon the book as it is carried through the machine by the conveyor mechanism.

Referring now particularly to Figs. 1–1A and 2–2A, the frame A of the present machine has a base frame indicated generally at 40 which includes a long cross member 41 at the outfeed end, a short cross member 42 at the infeed end, longitudinal frame members 43 and 44 connecting the cross members, and a short longitudinal drive frame member 45 which is connected by a diagonal frame member 46 with the longitudinal member 44. The base frame 40 is supported on casters 47 so that it may be readily moved into an assembly line. The space between the longitudinal frame member 44 and the short longitudinal motor frame member 45 is provided with several cross members 48, 49 and 50, and the member 45 has upright posts 51, 52 and 53, which together provide supports for the drive mechanism B; while the ends of the longitudinal frame members 43 and 44 are provided with corner posts 54, 55, 56 and 57 which serve as supports for the conveyor mechanism C. The longitudinal frame member 44 also has upright guide members 58 and 59 at its two ends the tops of which are connected by a longitudinal beam 60, and these elements together with upright lower jack screws 61 and 61a on the frame member 44 and depending upper jack screws 62 and 62a on the longitudinal beam 60 provide support for the forming iron mechanism D.

The frame for conveyor mechanism C includes a fixed lower conveyor frame member, indicated generally at 63, which is I-shaped in plan and has end pieces 63a and 63b bolted, respectively, to the corner posts 54—55 and 56—57, said end pieces being connected by a hollow square beam 63c. A movable upper conveyor frame member indicated generally at 64 includes an end piece 64a mounted on jack screws 54a and 55a which surmount the corner posts 54 and 55, an end piece 64b mounted on jack screws 56a and 57a which surmount the corner posts 56 and 57, and a hollow square beam 64c connecting the end pieces (see also Figs. 4 and 7).

Figure 1:
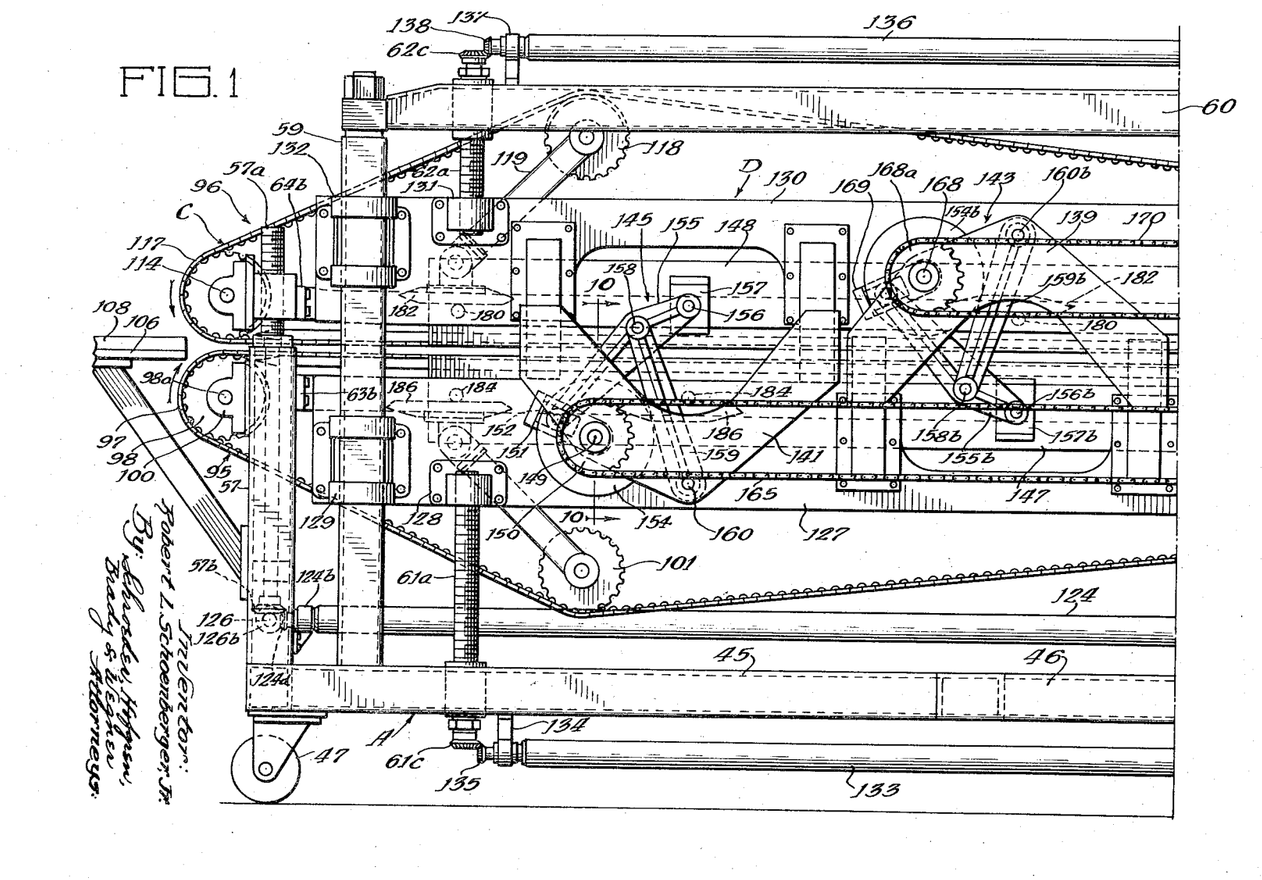
Figs. 1 and 1A together provide a side elevational view of a machine embodying the invention, with parts of the frame broken away.
Figure 1A:
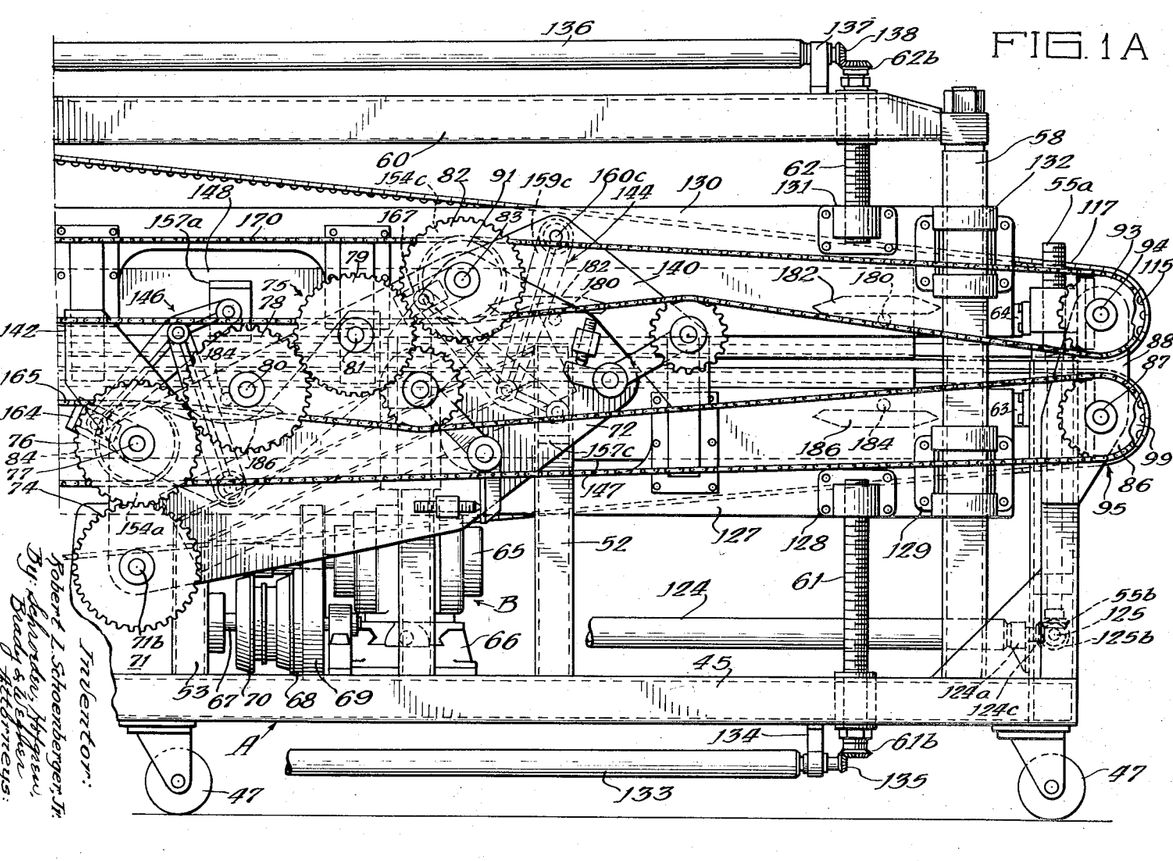
Figure 2:
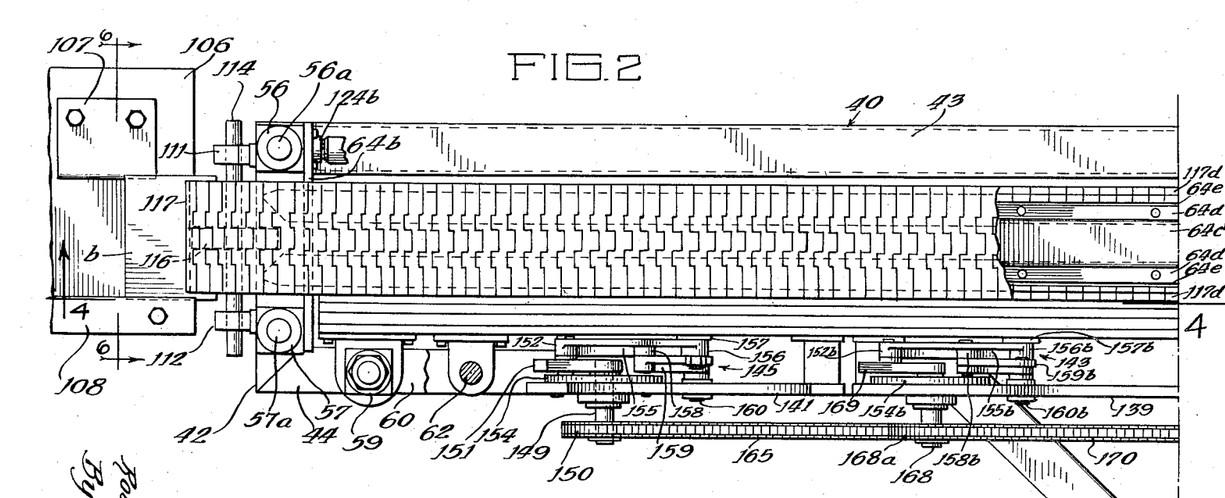
Figs. 2 and 2A together provides a plan view of the machine illustrated in Figs. 1 and 1A, with parts of the frame broken away.
Figure 2A:
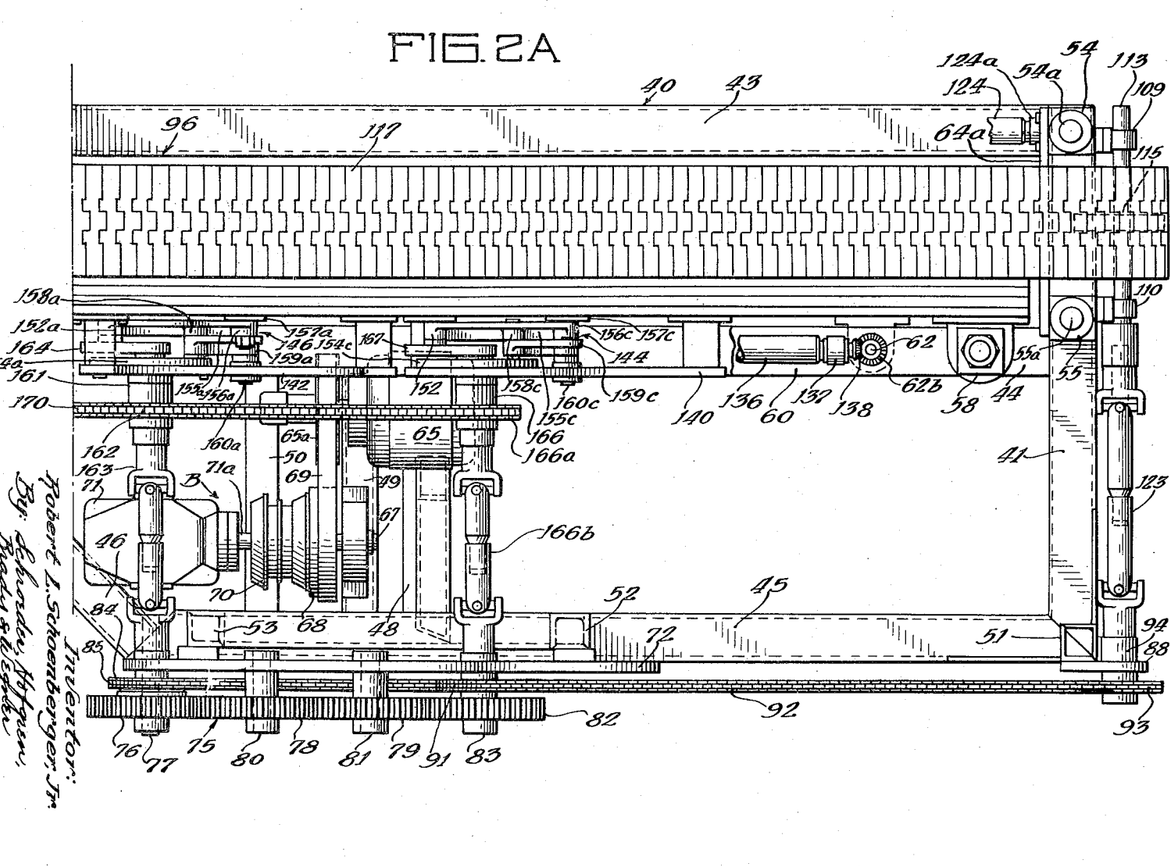
Figure 3:
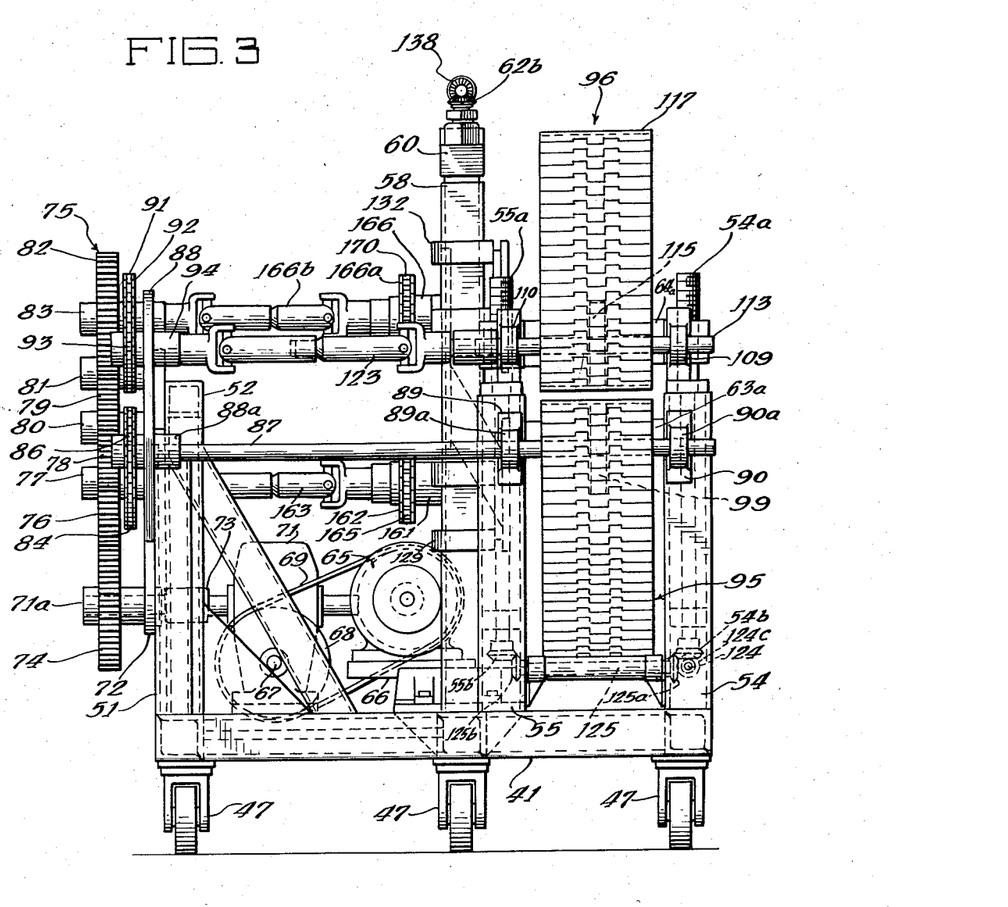
Fig. 3 is an end elevational view of the machine taken from the outfeed end.

Referring now particularly to Figs. 1A, 2A and 3, the drive mechanism B includes an electric motor 65 which is mounted on a bracket 66 adjacent the longitudinal frame member 44, a main drive shaft 67 which carries a flywheel 68 driven by a belt 69 from a motor pulley 65a, and an electric brake clutch unit 70 through which the drive shaft connects with the input shaft 71a of a gear box 71.

Supported on the upright posts 52 and 53 which are mounted on the short longitudinal frame member 45 is a drive gear supporting frame member 72 in one end of which is a bearing 73 for an output shaft 71b of the gear box 71, and on said output shaft outside the gear supporting frame 72 is a main drive gear 74 which makes driving connection with all the driven elements of the machine through a gear train indicated generally at 75 which is also supported on the gear supporting frame 72. The gear train 75 includes an input gear 76 which is mounted on a stub shaft 77 journalled in the support member 72, which meshes with the gear box output gear 74, and a pair of idler gears 78 and 79 on stub shafts 80 and 81, respectively, mounted in the support member 72, which serve to carry the drive from input gear 76 to an upper drive gear 82 which is mounted on a stub shaft 83 journalled in the supporting member 72. Coaxial with the input gear 76 is a lower drive sprocket 84 from which a chain 85 meshes with a lower conveyor power transmission sprocket 86 on a cross shaft 87 which is carried in journals 88a, 89a and 90a of brackets 88, 89 and 90, respectively, on the upright posts 51, 54 and 55 (see Figs. 2A and 3). The cross shaft 87 also carries a lower conveyor drive sprocket as will be described in connection with the conveyor assembly C.

The upper drive gear 82 is coaxial with a sprocket 91 from which an upper conveyor drive chain 92 is connected with an upper conveyor drive sprocket 93 which is mounted on a stub shaft 94 in the upper portion of the bracket 88.

The forming iron mechanism D is driven from the input shaft 77 and from the upper drive shaft 83 as will be explained in detail hereafter.

The conveyor mechanism C includes a lower book supporting conveyor chain unit indicated generally at 95 and an upper book compressing conveyor chain unit indicated generally at 96. The conveyor chain units 95 and 96 are fundamentally alike in their construction, the principal difference being that the lower unit is fixed while the upper unit is vertically adjustable so that the conveyor mechanism may accommodate books of different thicknesses.

As best seen in Figs. 1–1A, 2–2A, 4, 6 and 7, fixed lower conveyor chain unit 95 has a book supporting conveyor chain 97 on an idler sprocket 98 and a conveyor drive sprocket 99 which are carried, respectively, on a shaft 98a in brackets 100 on the corner posts 56 and 57, and upon the shaft 87. An idler sprocket 101 for tensioning the lower conveyor belt 97 is mounted on a pivoted arm 102 which is carried on a bracket 103 on lower conveyor frame member 63 so that the sprocket rests on the chain. Pressure of the idler 101 on the chain may be increased by a screw 104 carried in a threaded bracket 105 on the frame 63.

Figure 6:
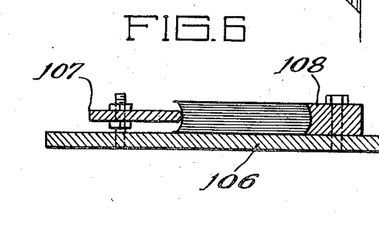
Fig. 6 is a fragmentary section on an enlarged scale taken as indicated along the line 6—6 of Fig. 2.

At the left-hand, or infeed end of the conveyor, and coplanar with the book supporting run 97a of the lower conveyor chain 97, is a book guide table 106 which is mounted on suitable brackets attached to the base A. As seen in Fig. 6, the book guide table is provided at one side with a laterally adjustable book face guide 107 which is at the side of the table opposite the joint forming mechanism D, and preferably this book face guide 107 is convexly curved to fit the curved front marginal portion *f* of a book (see Fig. 7). Adjustment of the face guide is so that the joint forming machine may accommodate books *b* of different widths, and regardless of book size the hinge areas *h* of the books may always be positioned between the irons of the forming mechanism D. Opposite the face guide 102 on the guide table is an infeed guide 108 which is concavely curved to receive the spine *s* of a book which enters the guide table either as a result of a hand feeding operation or mechanical feeding so as to slide the book along the infeed guide 108 into surface abutting engagement with the book face guide 107 so that as the books are picked up by the lower conveyor belt 97 they are always correctly positioned for the joint forming operation.

The vertically adjustable upper frame member 64 which is carried on the jack screws 54a, 55a, 56a and 57a is provided at its corners with four bearing members numbered, respectively, 109, 110, 111 and 112, and journalled in the bearings 109 and 110 is an upper conveyor drive shaft 113 while in the bearings 111 and 112 is an upper conveyor idler shaft 114, and carried on the shafts 113 and 114 are, respectively, an upper conveyor drive sprocket 115 and an upper conveyor idler sprocket 116.

Trained over the sprockets 115 and 116 is an upper book compressing conveyor chain 117 which may be adjustably tensioned by an idler sprocket 118 which is mounted on an arm 119 pivoted on a bracket 120 on the upper conveyor frame member 64. Movement of a screw 121 in a threaded bracket 122 permits adjustment of belt tension. As seen in Fig. 2A, the drive for the upper chain 117 is from the stub shaft 94 through a universal joint drive 123 to the upper conveyor drive shaft 113.

The upper conveyor chain unit 96 is adjusted by means of a longitudinal shaft 124 (Figs. 1 and 1A) which is supported in brackets 124a and 124b on longitudinal frame member 43. Gears 124c and 124d on said shaft mesh, respectively, with gears 54b and 56b at the lower ends of jack screws 54a and 56a. A cross shaft 125 on the frame cross member 41 has gears 125a and b operatively connecting gear 54b with a gear 55b on jack screw 55a; and an identical cross shaft 126 on frame cross member 42 has a gear (not shown) meshing with gear 54b, and a second gear 126b driving a gear 57b on jack screw 57a.

As seen in Fig. 7, the chain is a modified commercially available flat link chain having plate-like links such as the links 97b and 117b of the lower and upper conveyor chains, respectively. A round drive lug like the lugs 97c and 117c hingedly connects adjacent plates and also is engaged by rounded teeth of the conveyor sprockets. Welded onto the lower conveyor frame beam 63c is a guide plate 63d having fiber tracks 63e; and at the extreme outer marginal portions of the links 97b angle members 97d closely embrace the upright faces and the bottom faces of the fiber tracks 63e so that the lower conveyor chain 97 is fully guided and held against lateral movement or vertical play. Similarly, the upper conveyor frame beam 64c has a guide plate 64d provided with fiber tracks 64e which are embraced by angle guide members 117d on the upper conveyor plates 117b so as to fix the position of the upper conveyor chain 117 both laterally and vertically.

The joint forming mechanism D includes a lower forming iron beam 127 which is provided with threaded brackets 128 by means of which it may be moved vertically on the lower jack screws 61 and 61a, and has guide brackets 129 at its ends which embrace the lower portions of the posts 58 and 59 to guide the beam 127 in its vertical movement. Similarly, there is an upper forming iron beam 130 having threaded brackets 131 by means of which it is supported for vertical movement on the upper jack screws 62 and 62a, and which has guide brackets 132 which embrace the upper portions of the posts 58 and 59. Adjustment of the lower forming iron beam 127 is by means of a longitudinal adjusting rod 133 which is carried in brackets 134 under the central longitudinal beam 44, and said rod 133 has bevel gears 135 at its two ends meshing with bevel gears 61b and 61c on the lower ends of the jack screws 61 and 61a, respectively. Similarly, adjustment of the upper forming iron beam 130 is effected by means of an upper adjusting rod 136 which is journalled in brackets 137 on the upper frame member 60 and which has at its ends bevel gears 138 meshing with bevel gears 62b and 62c which are positioned, respectively, at the upper ends of the upper jack screws 62 and 62a.

As best seen in Figs. 1–1A, mounted on the lower joint forming beam 127 is a pair of outwardly and upwardly extending arcuate mounting brackets 139 and 140; while extending outwardly and downwardly from the upper joint forming beam 130 is a pair of similar but inverted arcuate supporting brackets 141 and 142. The brackets 139 and 140 serve, respectively, as mounting elements for front and rear lower forming iron actuating linkages, indicated generally by the numeral 143 and 144, respectively; while the mounting brackets 141 and 142 serve as supports, respectively, for front and rear upper forming iron actuating linkages indicated generally as 145 and 146, respectively. The linkages 143 and 144 cooperate to impart a desired motion to a lower forming iron 147, while the linkages 145 and 146 cooperate to impart a similar motion to an upper forming iron 148 (see Figs. 4 and 7). The elements of linkages 143, 144, 145 and 146 are all alike, so only one of the linkages will be described in detail.

The linkages are modified four-bar linkages. The four-bar linkage is particularly suitable for this operation because it gives a relatively smooth motion with substantially linear travel in a working direction at nearly constant velocity, and a quick return in a path only a short distance from the working path. However, for precise speed coordination between the forming irons 147 and 148 and the books b in the conveyor units 95 and 96 the four-bar linkage is modified by providing a variable length crank arm and a cam which evens out the variations in velocity which are normally encountered during the working stroke of a four-bar linkage. Furthermore, since a standard four-bar linkage provides a working path which is not quite a straight line, the structure is also modified by placing a spring box slider at the pivot between the iron and the linkage to permit the forming iron to be guided in a straight line by a four-bar cam which is mounted on the forming iron beam.

Figures 10, 11, 12:
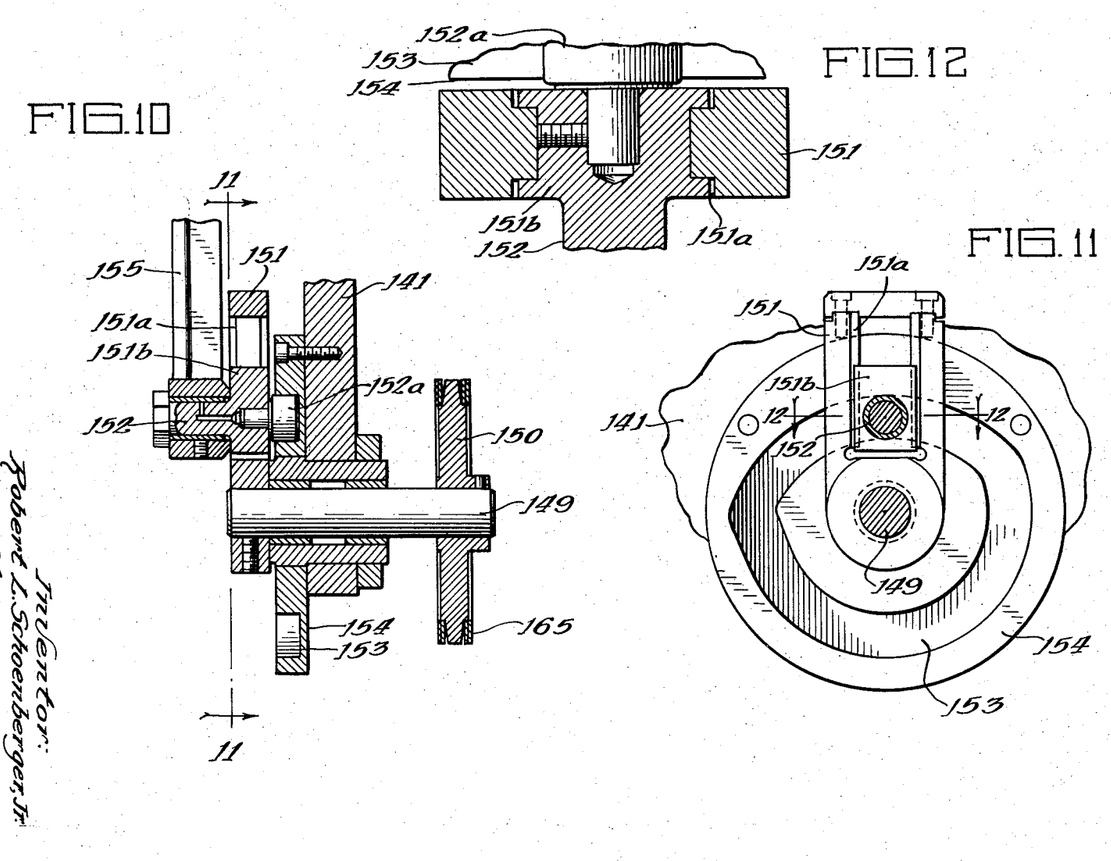
Fig. 10 is a fragmentary section on an enlarged scale taken as indicated along the line 10—10 of Fig. 1.
Fig. 11 is a fragmentary section taken as indicated along the line 11—11 of Fig. 10.
Fig. 12 is a fragmentary section on an enlarged scale taken as indicated along the line 12—12 of Fig. 11.

As best seen in Figs. 1, 4, 5, 7 and 10 to 12, the linkage bracket 141 is provided with a journal for a stub shaft 149 on the outer end of which is a sprocket 150 and on the inner end of which is a drive crank arm 151. Referring especially to Figs. 10 to 12, the crank arm 151 has a longitudinal (radial from the shaft) slideway 151a for a slide block 151b in which is mounted a crank pin 152. One end of the crank pin acts as a cam follower 152a and engages a cam track 153 of a fixed cam plate 154. The other end of crank pin 152 is pivotally connected to a drive link 155 at the other end of which is a forming iron pivot 156 which is resiliently connected with a spring box 157 (detailed in Figs. 13 and 14) on the forming iron 148. Intermediate the ends of the drive link 155 is a guide pivot 158 from which a rocker link 159 extends downwardly to a fixed pivot 160 in the bracket 141.

Figure 4:
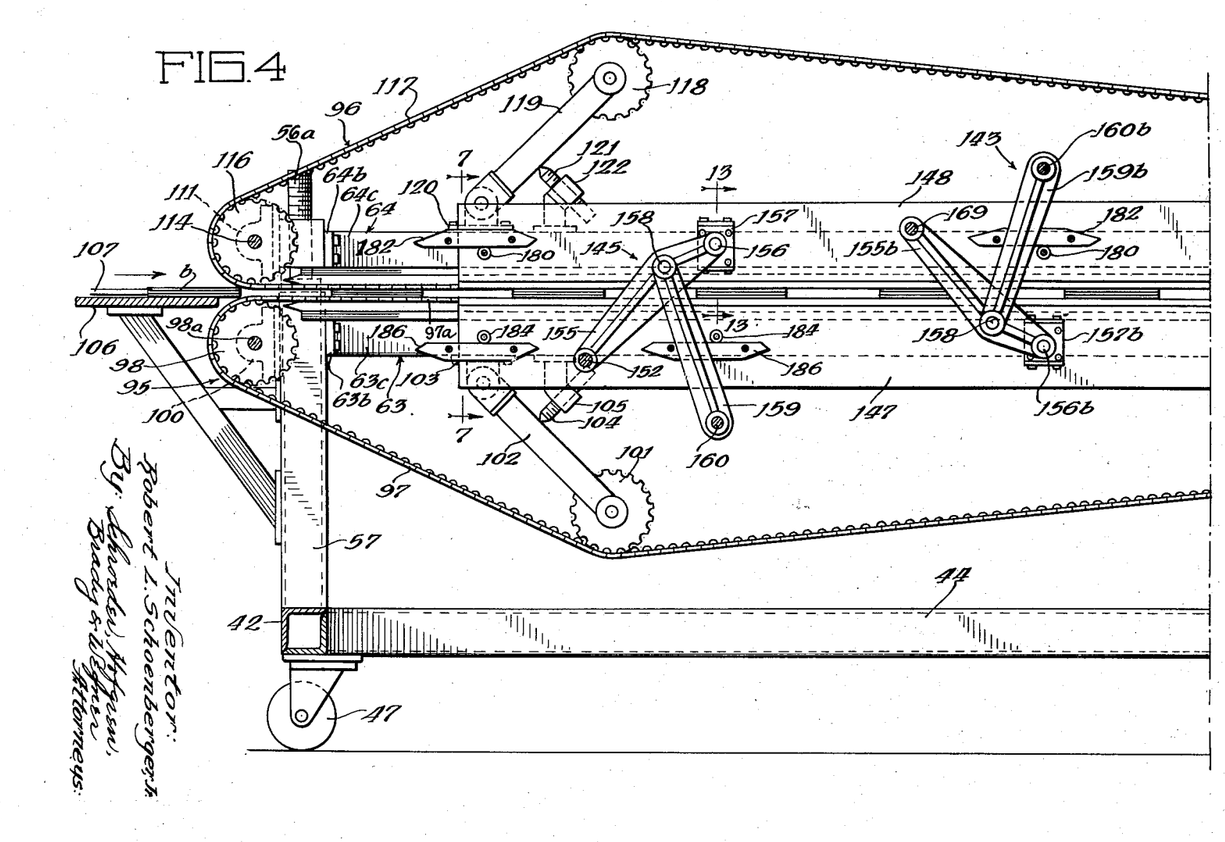
Fig. 4 is a fragmentary sectional view taken substantially as indicated along the line 4—4 of Fig. 2.

The elements of the drive linkages 143, 144 and 146 are the same as those of the linkage 145 but as seen in Figs. 1 and 4, the linkages 143 and 144 are generally inverted with respect to the linkages 145 and 146. Except for the stub shafts, sprockets and crank arms, which are separately numbered, the elements of all linkages bear the same numbers in the drawings as do those of linkage 145, the elements of 146 bearing the suffix "a," those of 143 the suffix "b," and those of 144 the suffix "c."

As seen in Figs. 1A and 2A the rear upper iron linkage 146 includes a stub shaft 161 which carries a drive sprocket 162 and is connected with the stub shaft 77 of the drive mechanism B by a universal joint connection 163. A drive crank 164 is mounted on the stub shaft 161 so as to be driven directly by the universal joint connection, while the sprocket 162 carries a roller chain 165 which is also trained over the sprocket 150 so as to drive the stub shaft 149 of the linkage 145.

The rear lower iron linkage 144 has a stub shaft 166 carrying a sprocket 166a which is connected by a universal joint 166b with the stub shaft 83 for the upper drive gear 82, and a drive crank 167 is mounted on the stub shaft 166 so as to be driven directly by the universal joint 166b. The front lower iron linkage 143 has a stub shaft 168 carrying a sprocket 168a and a crank arm 169, and the sprocket is connected by a roller chain 170 with the sprocket 166a of the linkage 144 so as to be driven thereby.

Figure 13:
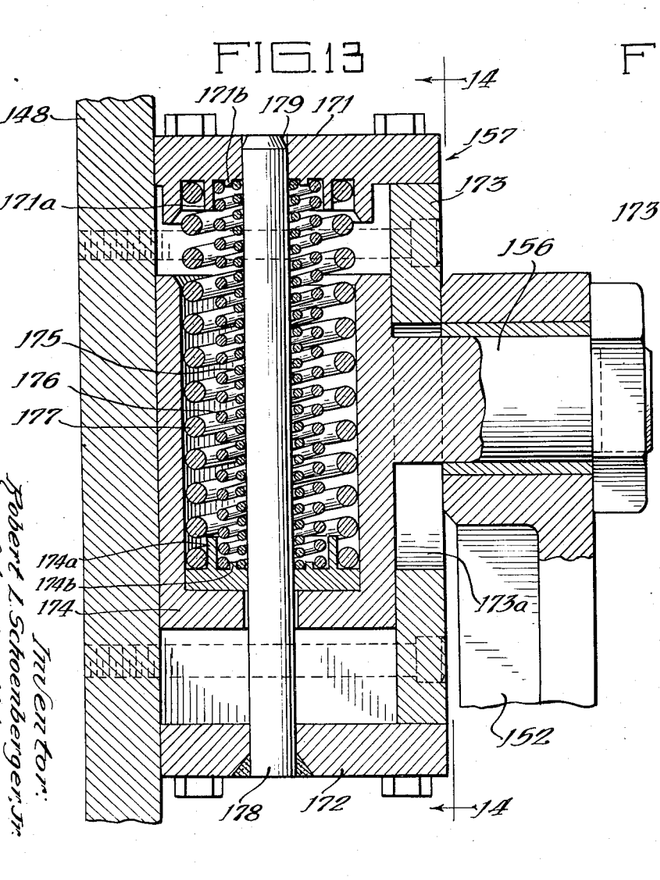
Fig. 13 is a fragmentary section on an enlarged scale taken as indicated along the line 13—13 of Fig. 4.
Figure 14:
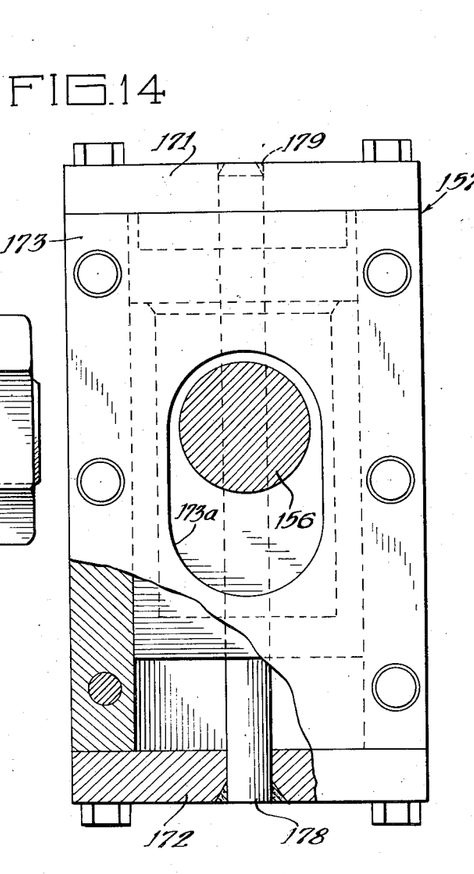
Fig. 14 is a section taken as indicated along the line 14—14 of Fig. 13 with a part broken away.

As seen in Figs. 1 and 1A, the upper joint forming iron 148 is provided as a part of the forward operating linkage 145 with the spring box 157 while included as a part of the rear operating linkage 146 is a spring box 157a. Similarly, the lower iron 147 has spring boxes 157b and c which are associated, respectively, with the operating linkages 143 and 144. Referring to Figs. 13 and 14, the spring box 157 includes top and bottom plates 171 and 172 and a front plate 173 provided with an upright slot 173a through which forming iron pivot 156 of drive link 155 extends. At its inner end the pivot 156 is provided with an integral spring cup 174 which is slidably mounted in the spring box and contains annular guide flanges 174a and 174b for three concentrically mounted compression springs 175, 176 and 177 which bear at their upper ends upon spring box top plate 171 between annular spring guide flanges 171a and 171b. an upright spring guide pin 178 is welded into the bottom plate 172 of the spring box and extends into an opening 179 in the top plate of the box. Thus, the spring box and the upper forming iron 148 may assume the position shown in Fig. 13 only against the force exerted by the compression springs 175, 176 and 177, and when the forming iron is released from the member which holds it against the spring pressure it moves upwardly as shown in Fig. 13 with respect to the pivot 153, lifting the upper forming iron 148.

Figure 5:
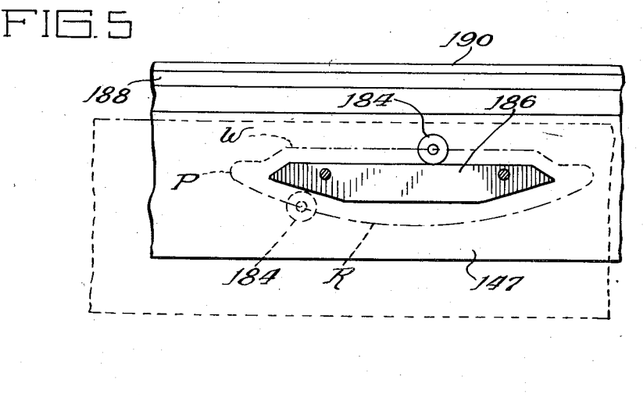
Fig. 5 is a fragmentary sectional view on an enlarged scale showing one of the lower forming iron control cams seen in Fig. 4.

As seen in Figs. 1, 1A and 4, the forming iron 148 on its working stroke is held down by four cam follower rollers 180 which travel along the flat undersides of four iron control bar cams 182 which are mounted on the upper longitudinal forming iron beam 130. Similarly, the lower iron is provided with four cam follower rollers 184 which, during the working stroke of the iron, travel along flat upper surfaces of four bar cams 186 to hold the lower iron up. It is the cam followers 180, 181, 184 and 185 riding along the flat faces of the bar cams 182, 183, 186 and 187 which give the forming irons their completely straight travel during the working stroke; and this deviation from the normal travel of pivot pin 153 of the four-bar linkage is permitted by the slotted spring box 154. The path of travel P of the cam follower 184 around the bar cam 186 is illustrated in Fig. 5, which shows that the cam follower moves straight along a working path W and moves rapidly away from the working path or toward the working path at each end of its travel, between the working path and a return path R.

Rotation of the stub shaft 149 for the drive crank 151 rotates the crank, which imparts a motion to the drive link 155 and thus to the upper forming iron 148, and the rocker link 159 controls and guides this movement in the way of an ordinary four-bar linkage. However, since the crank pin 152 of the drive crank 151 is not fixed, but instead is radially slidable in the slideway 151a and has the cam follower 152a engaged in the cam track 153, the normal motion of the drive link 155 is varied at the control of the cam track 153. The mechanical effect of this arrangement is to vary the length of the drive crank 151 as it rotates, and this variation is computed so as to provide a constant speed at the forming iron pivot 156 during the entire working stroke of the forming iron.

Even with this modification from a standard four-bar linkage the forming iron 148 would not travel exactly in a straight line during its working stroke. The desired straight line travel is provided by the cam roller 180 which, on the working stroke of the iron, travels along the flat underside of the iron control bar cam 182. This deviation from the normal path of travel produced by the four-bar linkage is permitted by the inclusion in the combination of the spring box 157. Since the rear upper forming iron linkage 146 is driven in conjunction with the linkage 145, the upper forming iron 148 moves in a translatory path as shown by the broken line in Fig. 5, but that path is inverted from that which is shown in Fig. 5. The lower forming iron 147 moves in a translatory path which is exactly as shown by the broken line in Fig. 5.

As seen in Figs. 7 and 9, the forming irons 147 and 148 are provided, respectively, with jaw plates 188 and 189 carrying joint forming jaws 190 and 191, respectively. In order to heat the jaws electrical resistance elements 188a and 189a are mounted in contact with the jaws 190 and 191, respectively, and are heated through conventional electric circuits.

The foregoing detailed description is given for clearness of understanding only and no unnecessary limitations are to be understood therefrom, as some modifications will be obvious to those skilled in the art.

I claim:
1. In a machine for forming hinge joints in cased books: a frame; book gripping conveyor means for moving cased book continuously forward through said frame with their hinge areas exposed in longitudinal alignment; a pair of opposed, parallel, joint forming irons flanking the aligned hinge areas of several books in the conveyor means; and iron actuating means on the frame in operative connection with said forming irons to move the irons conjointly in identical, opposed, closed translatory paths which include a working path in which the irons move forward with the books and grip them to crease their hinge areas, said actuating means including speed control means for driving the irons in the same general direction and at the same speed as the books during said working paths, and iron control means cooperating with said speed control means to confine said working paths to a straight line.

2. In a machine for forming hinge joints in cased books: a frame; book gripping conveyor means for moving cased books continuously forward through said frame with their hinge areas exposed in longitudinal alignment; a pair of opposed, parallel, joint forming irons flanking the aligned hinge areas of several books in the conveyor means; and iron actuating means on the frame in operative connection with said forming irons to move the irons conjointly in identical, opposed, closed translatory paths which include a working path in which the irons are driven positively forward in the same direction and at the same speed as the books and grip them to crease their hinge areas, said actuating means including iron control cam means operative throughout the working paths of said irons to confine said working paths to a straight line.

3. In a machine for forming hinge joints in cased books: a frame; book gripping conveyor means for moving cased books continuously forward through said frame with their hinge areas exposed in longitudinal alignment; a pair of opposed, parallel, joint forming irons flanking the aligned hinge areas of several books in the conveyor means; and iron actuating means on the frame in operative connection with said forming irons to move the irons conjointly in identical, opposed, closed translatory paths which include a working path in which the irons move forward with the books and grip them to crease their hinge areas, said actuating means including speed control cam means operative throughout the working paths of said irons to drive the irons at the same speed and in the same direction as the books, and including iron control cam means operative throughout the working paths of said irons to confine said working paths to a straight line.

4. In a machine for forming hinge joints in cased books: a frame; book gripping conveyor means for moving cased books continuously forward through said frame with their hinge areas exposed in longitudinal alignment; a pair of opposed, parallel, joint forming irons flanking the aligned hinge areas of several books in the conveyor means; linkage means on the frame pivotally connected with said forming irons to move the irons conjointly in identical, opposed closed translatory paths which include a working path in which the irons move in the same direction as the books and grip them to crease their hinge areas; speed control cam means operatively associated with said linkage means to drive the irons at the same speed as the books throughout the working paths; and iron control cam means operatively associated with the linkage means to confine said working paths to a straight line.

5. In a machine for forming hinge joints in cased books: a frame; book gripping conveyor means for moving cased books continuously forward through said frame with their hinge areas exposed in longitudinal alignment; a pair of opposed, parallel, joint forming irons flanking the aligned hinge areas of several books in the conveyor means; spring box means on each forming iron provided with spring loaded slidable forming iron pivots; linkage means on the frame operatively connected with said forming iron pivots to drive the irons conjointly in identical, opposed closed translatory paths which include a working path in which the irons move in the same direction and at the same speed as the books and grip them to crease their hinge areas; and iron control cam means operatively associated with the linkage means to confine said working paths to a straight line, said pivots sliding in said spring box means to accommodate the action of said control cam means.

6. The device of claim 5 in which the iron control cam means includes fixed cams on the frame having straight working faces, and cam followers on the irons which follow the working faces of the fixed cams throughout the working paths of the irons.

7. In a machine for forming hinge joints in cased books: a frame; book gripping conveyor means for moving horizontally disposed cased books continuously forward through said frame with their hinge areas exposed in longitudinal alignment; upper and lower joint forming irons flanking the hinge areas of several books in the conveyor means; a pair of upper, modified four-bar linkages on the frame pivotally connected with the upper irons and a pair of lower, modified four-bar linkages on the frame pivotally connected with the lower irons, said linkages being arranged to drive the upper and lower irons conjointly in identical, opposed, closed translatory paths which include a working path in which the irons move forward with the books and grip them to crease their hinge areas; and a speed control cam operatively associated with each four-bar linkage to drive the irons positively at the same speed as the books throughout their working paths.

8. In a machine for forming hinge points in cased books: a frame; book gripping conveyor means for moving horizontally disposed cased books continuously forward through said frame with their hinge areas exposed in longitudinal alignment; upper and lower joint forming irons flanking the hinge areas of several books in the conveyor means; a pair of upper, modified four-bar linkages on the frame pivotally and resiliently connected with the upper irons and a pair of lower, modified four-bar linkages on the frame pivotally and resiliently connected with the lower irons, said linkages being arranged to move the upper and lower irons conjointly in identical, opposed, closed translatory paths which include a working path in which the irons move forward with the books and grip them to crease their hinge areas; a speed control cam operatively associated with each four-bar linkage to drive the irons at the same speed as the books throughout their working paths; a pair of fixed iron control cams on the frame adjacent each forming iron, each said iron control cam having a straight, horizontal working face; and a cam on each iron which follows the working face of each control cam throughout the working path of the iron to confine the working path to a straight line, said resilient connection of each linkage serving to accommodate the action of the iron control cam.

9. In a machine for forming hinge joints in cased books: a frame; book gripping conveyor means for moving horizontally disposed cased books continuously forward through said frame with their hinge areas exposed in longitudinal alignment; upper and lower joint forming irons flanking the hinge areas of several books in the conveyor means; and a pair of upper, modified four-bar linkages on the frame pivotally connected with the upper irons and a pair of lower, modified four-bar linkages on the frame pivotally connected with the lower irons, each of said linkages including a rotatable drive crank arm having a radially slidable crank pin provided with a cam follower, a drive link pivotally connected to said crank pin and to the iron, a rocker link pivoted on the frame and between the ends of the drive link, and a fixed cam on the frame having a cam track engaged by said cam follower, said linkages being arranged to move the upper and lower irons conjointly in identical, opposed, closed translatory paths which include a working path in which the irons move forward with the books and grip them to crease their hinge areas, and said cam tracks being arranged to drive the irons at the same speed as the books throughout their paths.

10. In a machine for forming hinge joints in cased books: a frame; book gripping conveyor means for moving horizontally disposed cased books continuously forward through said frame with their hinge areas exposed in longitudinal alignment; upper and lower joint forming irons flanking the hinge areas of several books in the conveyor means; a pair of upper, modified four-bar linkages on the frame pivotally and resiliently connected with the upper irons and a pair of lower, modified four-bar linkages on the frame pivotally and resiliently connected with the lower irons, said linkages being arranged to drive the upper and lower irons conjointly in identical, opposed, closed translatory paths which include a working path in which the irons move forward with the books and grip them to crease their hinge areas; a pair of fixed iron control cams on the frame adjacent each forming iron, each said iron control cam having a straight horizontal working face; a cam follower on each iron which follows the working face of each control cam throughout the working path of the iron to confine the working path to a straight line said resilient connection of each linkage serving to accommodate the action of the control cam.

11. In a machine for forming hinge joints in cased books: a frame; book gripping conveyor means for moving horizontally disposed cased books continuously forward through said frame with their hinge areas exposed in longitudinal alignment; upper and lower joint forming irons flanking the hinge areas of several books in the conveyor means; a pair of upper, modified four-bar linkages on the frame pivotally and resiliently connected with the upper irons and a pair of lower, modified four-bar linkages on the frame pivotally and resiliently connected with the lower irons, each of said linkages including a rotatable drive crank arm having a radially slidable crank pin provided with a cam follower, a drive link pivotally connected to said crank pin and to the iron, a rocker link pivoted on the frame and between the ends of the drive link, and a fixed cam on the frame having a cam track engaged by said cam follower, said linkages being arranged to move the upper and lower irons conjointly in identical, opposed, closed translatory paths which include a working path in which the irons move forward with the books and grip them to crease their hinge areas, and said cam tracks being arranged to move the irons at the same speed as the books throughout their working paths; a pair of fixed iron control cams on the frame adjacent each forming iron, each said iron control cam having a straight, horizontal working face; and a cam follower on each iron which follows the working face of each control cam throughout the working path of the iron to confine the working path to a straight line, said resilient connection of each linkage serving to accommodate the action of the iron control cam.

References Cited in the file of this patent

UNITED STATES PATENTS

| | | |
|---|---|---|
| 2,083,720 | Lariviere | June 15, 1937 |
| 2,151,957 | Davis | Mar. 28, 1939 |
| 2,635,776 | Cook et al. | Apr. 21, 1953 |
| 2,714,732 | Traettino | Aug. 9, 1955 |
| 2,725,156 | Manas | Nov. 29, 1955 |